(12) United States Patent
Cho et al.

(10) Patent No.: US 7,979,443 B2
(45) Date of Patent: Jul. 12, 2011

(54) META-DATA INDEXING FOR XPATH LOCATION STEPS

(75) Inventors: SungRan Cho, Hannover (DE); Nick Koudas, Toronto (CA); Divesh Srivastava, Summit, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 0 days.

(21) Appl. No.: 12/938,754

(22) Filed: Nov. 3, 2010

(65) Prior Publication Data
US 2011/0047185 A1    Feb. 24, 2011

Related U.S. Application Data

(63) Continuation of application No. 11/339,388, filed on Jan. 25, 2006, now Pat. No. 7,849,091.

(51) Int. Cl.
G06F 7/00 (2006.01)
G06F 17/30 (2006.01)
(52) U.S. Cl. ...................................................... 707/743
(58) Field of Classification Search .................. None
See application file for complete search history.

(56) References Cited

U.S. PATENT DOCUMENTS

| | | | |
|---|---|---|---|
| 5,745,759 A | 4/1998 | Hayden et al. | |
| 6,115,717 A | 9/2000 | Mehrotra et al. | |
| 6,381,605 B1 | 4/2002 | Kothuri et al. | |
| 6,510,434 B1 | 1/2003 | Anderson et al. | |
| 6,654,734 B1 | 11/2003 | Mani et al. | |
| 6,745,206 B2 | 6/2004 | Mandler et al. | |
| 6,950,828 B2 * | 9/2005 | Shaw et al. | 707/743 |
| 2003/0140308 A1 | 7/2003 | Murthy et al. | |
| 2004/0064466 A1 | 4/2004 | Manikutty et al. | |
| 2005/0114316 A1 | 5/2005 | Fontoura et al. | |

OTHER PUBLICATIONS

Kratky, Efficient Searching in Large Inheritance Hierarchies, 2005, DEKA 2005, 940-952.*
Widom, Jennifer, "Trio: A System for Integrated Management of Data, Accuracy, and Lineage", Proceedings of the 2005 CIDR Conference, pp. 1-15 (2005), Asilomar, California (U.S.).
Maier et al., "Querying Bi-Level Information", Seventh International Workshop on the Web and Databases, pp. 1-6 (2004), Paris, France.
Delcambre et al., "Bundles in Captivity: An Application of Superimposed Information", pp. 1-10 (2005), Oregon (U.S.).

* cited by examiner

*Primary Examiner* — Pierre M Vital
*Assistant Examiner* — Jason Liao
(74) *Attorney, Agent, or Firm* — Hoffman & Baron, LLP

(57) ABSTRACT

In accordance with a method of encoding meta-data associated with tree-structured data, a first set of elements of a plurality of elements in the tree-structured is associated explicitly with explicit meta-data levels, and a second set of elements of the plurality of elements is associated by inheritance with explicit meta-data levels of closest ancestor elements of the first set of elements. The plurality of elements is packed into a plurality of leaf nodes of an index structure. The plurality of leaf nodes is merged into a plurality of non-leaf nodes until a root non-leaf node is generated. The plurality of non-leaf nodes of the index structure is associated with indicators representing ranges of the explicit meta-data levels in the packed first set of elements, such that explicit meta-data level ranges of descendant non-leaf nodes are subsets of explicit meta-data level ranges of ancestor non-leaf nodes.

20 Claims, 14 Drawing Sheets

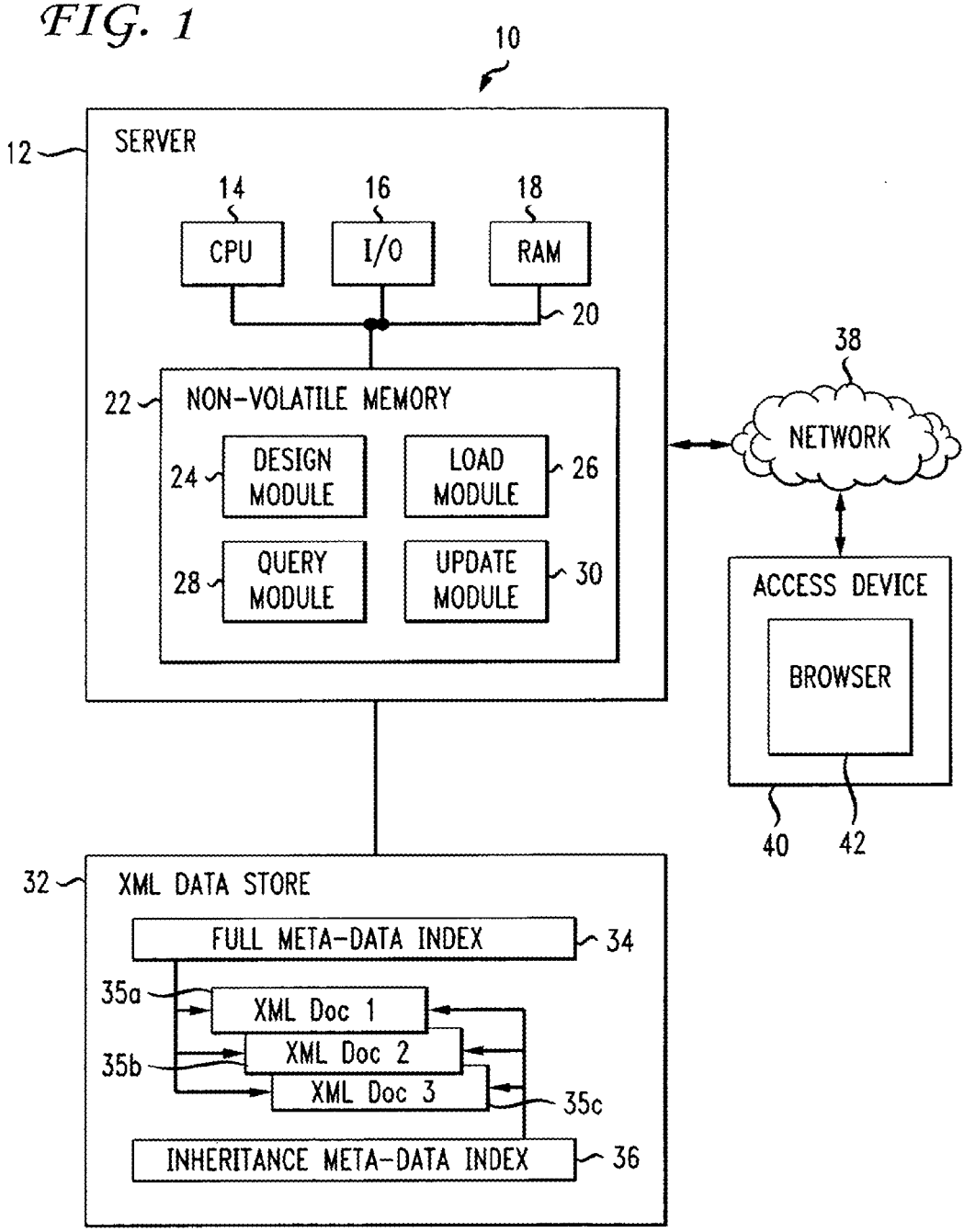

*FIG. 2*

| Axis | Conditions |
|---|---|
| descendant | Ln(result)>Ln(n), Rn(result)>Rn(n) |
| ancestor | Ln(result)<Ln(n), Rn(result)<Rn(n) |
| parent | Ln(result)<Ln(n), Rn(result)<Rn(n), Ln(result)=PLn(n) |
| child | Ln(result)>Ln(n), Rn(result)>Rn(n), PLn(result)=Ln(n) |
| preceding | Ln(result)<Ln(n), Rn(result)>Rn(n) |
| following | Ln(result)>Ln(n), Rn(result)<Rn(n) |
| preceding-sibling | Ln(result)<Ln(n), Rn(result)>Rn(n), PLn(result)=PLn(n) |
| following-sibling | Ln(result>Ln(n), Rn(result)<Rn(n), PLn(result)=PLn(n) |

FIG. 4

```
Algorithm bulkLoad
Input: a node v, a page p;
Output: index tree;
/* blist is a temporary boundary nodes list */
/* initially pagenum=0 */
if (p.size = pageCapacity) {
   pagenum++;
   for each item c of p.blist {
      boundary = true;
      for each item p of p.parent.blist {
         if (p.Ln<c.Ln & p.Rn<c.Rn) boundary=false;}
      if (boundary) p.parent.blist += c; }}
else {
   p.size += v.size;
   if (v.ActML ≠ 0) { /* defined */
      if (v.ActML < p.lowActML) p.lowActML=v.ActML;}
   else if (v.ActML = 0) { /* inherited */
      if (stack(top).pagenum ≠ pagenum) p.blist+=v;
         /* v is a boundary node */
      if (stack(top).ML=p.lowInhML)
         p.lowInhList+=stack(top).InhNode;
      else if (stack(top).ML < p.lowInhML) {
         p.lowInhML=stack(top).ML;
         p.lowInhList=stack(top).InhNode; }}}
pushInhNode(v, pagenum);
end Algorithm procedure pushInhNode
Input: a node v, pagenum;
popStack(v);
pushStack(v, pagenum);
if (v.ActML = 0) {
   stack(top).ML=stack(top-1).ML;
   stack(top).InhNode=stack(top-1).InhNode;}
else {
   stack(top).InhNode=v; stack(top).ML=v.ActML;}
end procedure
```

FIG. 5

```
/*pushStack () checks anclist when stack is empty*/
/*pageEntry() makes '-' explicit */
Algorithm eightAxes
Input:    a node v, and axis;
Output:   a set of desirable result element nodes;
if (axis=desc) pushStack(v);
else if (axis=foll|prec)
    ancList.add(XPath-Axes(anc,root,v));
XPath-Axes(axis,root,v);
end Algorithm procedure XPath-Axes ——— 90
Input:    an axis, an index page p, a node v;
/*constraints() check the conditions in Table 1=*/
if (p is a non-leaf page) {
  for each page item g of p {
    pageEntry(q);
    if (constraints(axis,q)) {
      if (q.lowActML(≠0) ≤ uml or q.lowInhML(≠0)≤uml)
        XPath-Axes(axis,q.child,v); }}}
else if (p is a leaf page) {
  for each data item d of p {
    if (constraints(axis, d)) {
      if (axis=desc|foll|prec) popStack(d);
      if ((d.ActML≠0 & d.ActML ≤ uml or
          (d.ActML=0 & (axis=child or
          (axis=par|foll-sib|prec-sib & nearestAnc(root,v))
        or (axis=desc|anc|foll|prec &
            Stack(top).Ln=d.PLn)))) { select d; }
      if (axis=desc|anc|foll|prec) pushStack(d); }}}
end procedure function nearestAnc ——————— 92
Input:    a page p, a node n;
if (p is a non-leaf page) {
  for each page item q of p in reverse order{
    pageEntry(q);
    if (q.highLn ≤ n.Ln & q.highRn ≤ n.Rn) {
      if (max(q.highInhML,q.highActML)≤uml) return TRUE;
      if (min(q.lowInhML,q.lowActML) > uml or
          (q.lowInhML=0 & uml<q.lowActML or
          (q.lowActML=0 & uml<q.lowInhML)) return FALSE;}
    nearestAnc(q.child, n); }}
end function
```

FIG. 7

```
/*ML,oldML are a new ,old meta-data level of n,resp.*/
Algorithm modifyML      106
Input: a node v;
topdown-ActualML(root,v);
if (ML=0) nAnc = findNearestAncWithML(v);
topdown-InheritML(root,v,,nAnc);
end Algorithm procedure topdown-ActualML
Input: a page p, a node v;
if (p is a non-leaf page) {
  for each page item q of p {
    if (q.lowLn ≤ v.Ln ≤ q.highLn &
        q.lowRn≤v.Rn≤ q.highRn) {
      pageEntry(q);
      topdown-ActualML(q.child,v); }}}
else if (p is leaf page) {
  nLowActML = ML;
  for each data item d of p {
    if (v = d) d.ActML=ML;
    if (d.ActML≠0) nLowActML=min(nLowActML,d.ActML); }
  bottomup-ActualML(p.parent,nLowActML); }
end procedure procedure bottomup-ActualML
Input: a page entry p, nLowActML;
aLowActML=p.lowActML;
for each page item q of p.child {
    if (q.lowActML = '-') q.lowActML=aLowActML;
    else nLowActML=min(nLowActML,q.LowActML); }
if (p.lowActML ≠ '-' p.lowActML=nLowActML;
for each page item q of p.child {
    if (q.lowActML=nLowActML) q.lowActML='-'; }
bottomup-ActualML(p.parent,nLowActML);
end procedure
```

FIG. 9

```
procedure inheritML  ⎯ 120
Input: page entry p,n,lowInhML,lowInhList,nAnc
if (p.child is a non-leaf index page) {
  for (i=0; i , p.size () ; i++) {
    if (n.Ln≤p(i).highLn & n.Rn≤p.(i).highRn) {
      pgEntry(p(i).lowInhML,lowInhList);
      if ( (n.Ln<p(i).lowLn & n.Rn<p(i).lowRn & (lowInhML=0
        or ( ∃m ∈ lowInhList s.t. n.Ln<m.Ln<p(i).lowLn
        & n.Rn<m.Rn<p(i).lowRn) ) ) or (ML(≠0)<LowInhML &
n=lowInhList) ) bottomUp-inheritML(p.parent,n,nAnc);}
    else inheritML(p(i).child,n,lowInhML,
      lowInhList,nAnc); }}
else bottomUp-inheritML(p.parent,n,nAnc);
end procedure procedure bottomUp-inheritML
Input: page entry p, n, nAnc
aLowInhML=p.lowInhML; aLowInhList=p.lowInhList;
update lowInhML, lowInhList of child pages if '-';
if (p.child is a non-leaf index page) {
  for (i=0; i<p.child.size(); i++) {
/* let mList be ∀m in p.child(i).lowInhList
    s.t. .Ln<p.lowLn & m.Rn<p.lowRn; */
    if (p.child(i).lowInhML=nLowInhML)nLowInhList+=mList;
    else if (p.child(i).lowInhML<nLowInhML & ∃m ∈
      p.child(i).lowInhList s.t. m.Ln<p.lowLn &
      m.Rn<p.lowRn) {
      n.LowInhML=p.child(i).lowInhML;nLowInhList=mlist;}}}
```

FIG. 9 (Continued)

```
else {
if( (ML=0 & nAnc.Ln<p.lowLn & nAnc.Rn<p.lowRn)or oldML=0
    or(oldML=aLowInhML & ML>oldML & alowInhList.size=1) ) {
  for (i=0; i < p.size(); i++) {
      perform stack operation in Section3.3;
      if (p.child(i)=n & nAnc.Ln<p.lowLn & nAnc.Rn<p.lowRn
         & ML=0) updateInh(nAnc,nLowInhML,nLowInhList);
      else if (n=boundaryNode) }
/*let CA be closest anc. in aLowInhList of p.child;*/
      if (∃ CA & p.child(i).PLn=CA.Ln) A=CA;
      else A=findNearestAncestorWithML(p.child(i));}
   if (A=n) {/* node inherits from n */
      if (ML=0) updateInh(nAnc,nLowInhML,nLowInhML,nLowInhList);
      else updateInh(n,nLowInhList);}
      else updateInh(A,nLowIngML,nLowInhList);}}
else {
  if (ML<aLowInhML) {nLowInhML=ML;nLowInhList=n;}
  else {
    nLowInhML=aLowInhML;
    if(oldML=aLowInhML & aLowInhList.size>1 &
    ML.aLowInhML) nLowInhList=aLowInhList-n;
    else if(ML=aLowInhML) nLowInhList=aLowInhList+n;
    else nLowInhList=aLowInhList; }}}
p.lowInhML=nLowInhML; p.lowInhList=nLowInhList;
change lowInhML,lowInhList of child pages back to '-';
bottomUp-inheritML(p.parent,n,nAnc);
end procedure
```

META-DATA INDEXING FOR XPATH LOCATION STEPS

CROSS-REFERENCE TO RELATED APPLICATION

This application is a continuation of U.S. patent application Ser. No. 11/339,388 filed on Jan. 25, 2006, which is incorporated herein by reference in its entirety.

BACKGROUND

1. Field

The present invention generally relates to meta-data querying, and more particularly to meta-data indexing for XPath location steps.

2. Brief Description of Related Art

Companies are using the World Wide Web (Web) as the main means of information dissemination, and eXtensible Markup Language (XML) has become the de facto standard for information representation and exchange over the Web. XML provides a file format for representing information and a schema for describing the structure of information in documents. XPath is a language that describes a way to locate and process information stored in XML documents and uses an addressing syntax based on a path through the document's logical structure or hierarchy. Typically, XPath searches information contained in an XML document as a logical ordered tree.

The information contained in XML documents is often the result of collecting, cleansing and integrating data from a diverse set of data sources. This data can be of varying degrees of quality (e.g., accuracy, freshness, completeness, etc.) and sensitivity. Annotating the XML data with meta-data about the nature of source data and the processing performed to produce the XML data is valuable in understanding and querying the resulting XML data.

When querying XML data, it is desirable to permit querying of quality and sensitivity meta-data along with the data and to identify the XML data that satisfy specified meta-data constraints. For example, different users may be satisfied with different levels of quality guarantees in returned answers (e.g., sales numbers with approximation accuracy within 5%; stock market quotes updated in the last 1 hour). Similarly, different users may be granted access to different parts of the data based on specified security policies (e.g., senate documents with security level<secret).

Some research on enhancing data with additional meta-data, and querying the meta-data along with data has been conducted. For example, as described in the publications Bundles in captivity: An application of superimposed information. In Proc. of ICDE, 2001 and in Querying bi-level information, In Proc. of WebDB 2004, Delcambre et al. discuss "superimposed information", where a second level of information (annotations, comments, etc.) is layered over underlying data, and bi-level queries are discussed that allow applications to query both layers as a whole. In the publication, An annotation management system for relational databases, In Proc. VLDB, 2004, Bhagwat et al. discuss storing additional information directly with relational underlying data, and the problem of propagating annotations (such as lineage) through query operators in a subset of SQL. Furthermore, in the publication entitled Trio: A system for integrated management of data, accuracy and lineage, In Proc. of CIDR, 2005, Widom discusses a proposed integrated management of data, accuracy, and lineage and describes data model (TDM) and query language (TriQL) issues relating to the same.

Although research has contributed to an understanding of data model and query language issues relating to meta-data querying, both within the relational model and the XML model, a need exists to provide indexes and access methods that efficiently support meta-data querying.

SUMMARY

In accordance with an embodiment of the invention, there is provided a method of encoding meta-data associated with tree-structured data.

The method includes associating explicitly a first set of elements of a plurality of elements in the tree-structured data with explicit meta-data levels, and associating by inheritance a second set of elements of the plurality of elements in the tree-structured data with explicit meta-data levels of closest ancestor elements of the first set of elements.

The plurality of elements in the tree-structured data—which includes the first set of elements and the second set of elements and the meta-data levels associated therewith—are packed into a plurality of leaf nodes of an index structure. Further, the plurality of leaf nodes of the index structure are merged into a plurality of non-leaf nodes of the index structure until a root non-leaf node is generated.

Thereafter, the plurality of non-leaf nodes of the index structure are associated with indicators that represent ranges of the explicit meta-data levels in the packed first set of elements, such that explicit meta-data level ranges of descendant non-leaf nodes are subsets of explicit meta-data level ranges of ancestor non-leaf nodes.

In accordance with another embodiment of the invention, there is provided a system of encoding meta-data associated with tree-structured data. The system includes a processing device which has a design module.

The design module is configured to associate explicitly a first set of elements of a plurality of elements in the tree-structured data with explicit meta-data levels, and to associate by inheritance a second set of elements of the plurality of elements in the tree-structured data with explicit meta-data levels of closest ancestor elements of the first set of elements.

Further, the design module is configured to pack the plurality of elements in the tree-structured data—including the first set of elements and the second set of elements and the meta-data levels associated therewith—into a plurality of leaf nodes of an index structure.

The design module is also configured to merge the plurality of leaf nodes of the index structure into a plurality of non-leaf nodes of the index structure until a root non-leaf node is generated.

Moreover, the design module is configure to associate the plurality of non-leaf nodes of the index structure with indicators representing ranges of the explicit meta-data levels in the packed first set of elements, such that explicit meta-data level ranges of descendant non-leaf nodes are subsets of explicit meta-data level ranges of ancestor non-leaf nodes.

In accordance with a further embodiment of the invention, there is provided a computer-readable storage medium which stores operational instructions that, when executed by a processor, cause the processor to encode meta-data associated with tree-structured data.

The operational instructions cause the processor to associate explicitly a first set of elements of a plurality of elements in tree-structured data with explicit meta-data levels, and to associate by inheritance a second set of elements of the plurality of elements in the tree-structured data with explicit meta-data levels of closest ancestor elements of the first set of elements.

The operational instructions further cause the processor to pack the plurality of elements of the tree-structured data—which includes the first set of elements and the second set of elements and the meta-data levels associated therewith—into a plurality of leaf nodes of an index structure;

Yet further, the operational instructions cause the processor to merge the plurality of leaf nodes of the index structure into a plurality of non-leaf nodes of the index structure until a root non-leaf node is generated.

Moreover, the operational instructions cause the processor to associate the plurality of non-leaf nodes of the index structure with indicators representing ranges of the explicit meta-data levels in the packed first set of elements, such that explicit meta-data level ranges of descendant non-leaf nodes are subsets of explicit meta-data level ranges of ancestor non-leaf nodes.

Further details of the various embodiments are discussed in greater detail below.

BRIEF DESCRIPTION OF THE DRAWINGS

FIG. 1 illustrates a block diagram of a computer system for efficiently supporting meta-data querying.

FIG. 2 illustrates Axis and Conditions for processing XPath location steps.

FIG. 4 illustrates pseudo-code for implementing a stack-based bulk load.

FIG. 5 illustrates pseudo-code for traversing an XPath-axes.

FIG. 7 illustrates pseudo-code for updating actual meta-data levels.

FIG. 9 illustrates pseudo-code for updating inherited meta-data level information.

Like reference symbols in the various drawings indicate like elements.

DETAILED DESCRIPTION

Figure 3A:
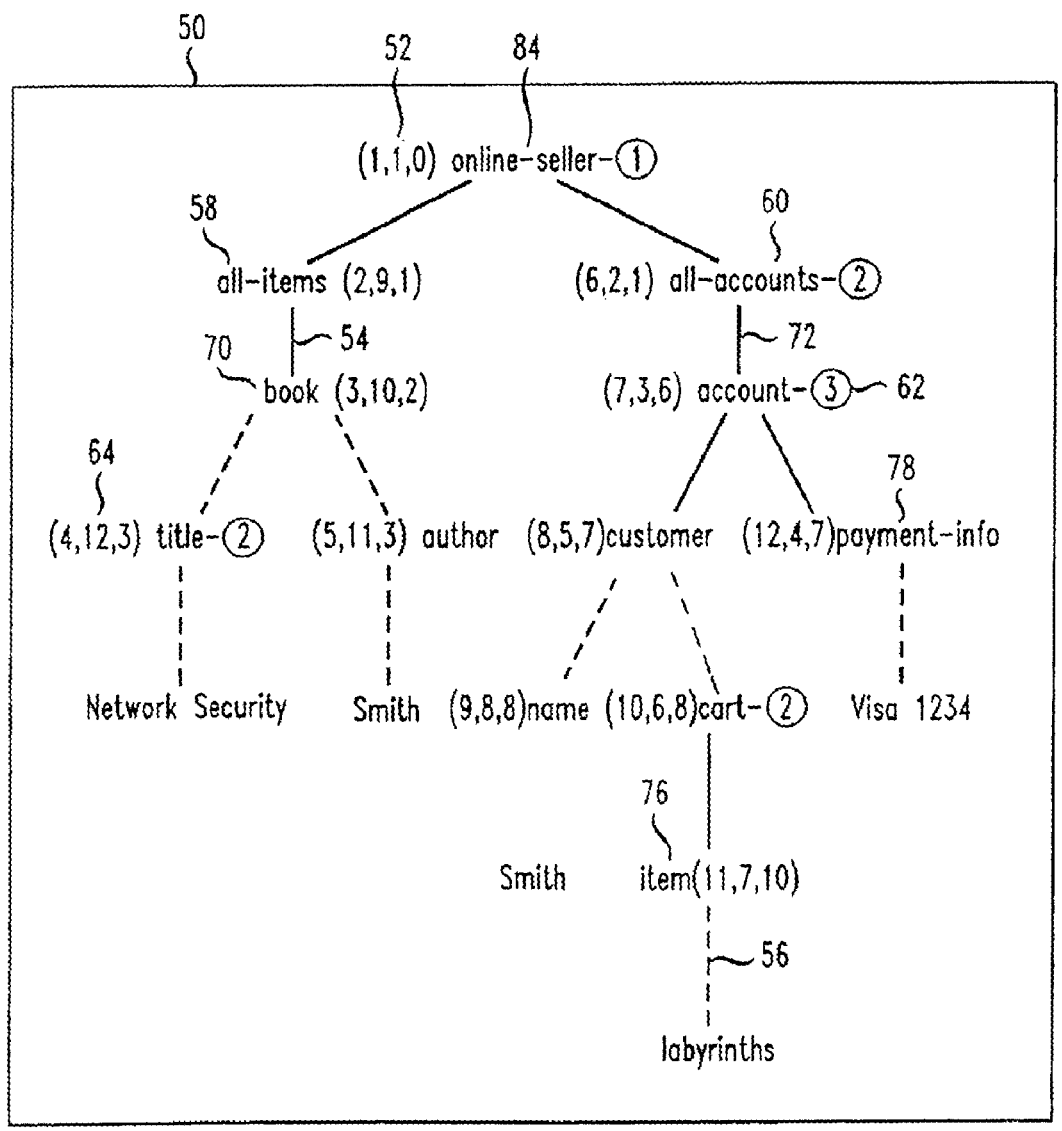
FIG. 3A illustrates an example Encoded Data Graph.

FIG. 1 illustrates a block diagram of a networked computer system 10 that provides efficient meta-data querying of XML documents. As shown in FIG. 1, the system 10 includes a server 12 that includes a central processing unit ('CPU') 14, random access memory ('RAM') 18, non-volatile memory 22 and an input-output device 16, all of which are preferably interconnected via a common bus 20 and controlled by the CPU 14.

An access device 40 is provided that may include a personal computer, a laptop computer, or other electronic-based device. The access device 40 is configured to include a browser 42 that may be used by a user to request services provided by the server 12 over a network 38. In one preferred embodiment, for example, the browser 42 facilitates browsing of different XML documents and may display queries and query results of XML documents from the server to the user. Although only one access device 40 is illustrated in FIG. 1, the system may be configured to support multiple access devices.

The network 38 may include various devices such as servers, routers and switching elements connected in an intranet, extranet or Internet configuration. In some embodiments, the network 38 may use wired communications to transfer information to and from the access device 40 and the server 12. In other embodiments, the network 38 may employ wireless communication protocols. In yet other embodiments, the network may use a combination of wired and wireless communication protocols.

As shown in FIG. 1, the system 10 is configured to include an XML data store 32 that is used to store XML data files 35a-c, a full meta-data index ('FMI') 34 and an inheritance meta-data index ('IMI') 36. The FMI 34 and IMI 36 indexes are used by the system 10 to search for information included in the XML data files 35a-c. Although only three XML data files 35a-c are shown in FIG. 1, the present invention is not limited to three XML data files and may operate with any number of XML data files.

Examples of XML data stores with which the present invention may operate include relational databases, such as Oracle, Sybase, Informix, SQL Server and DB2. In some preferred embodiments, the XML data store 32 is a directory server, such as a Lightweight Directory Access Protocol ('LDAP') server. In other embodiments, the XML data store 32 is a configured area in the non-volatile memory of server 12. It will be appreciated by one skilled in the art that the XML data store 32 may be configured to use additional structures, such as secondary storage devices and be distributed across both local and remote computer servers.

The FMI 34 index is a multi-dimensional index structure that includes an attribute for each XML element included in a given XML document. The attribute contains the element's (either specified or inherited) meta-data level. The IMI 36 index is a multi-dimensional index structure in which actual meta-data levels are associated only with elements for which a value is explicitly specified and inherited meta-data levels and inherited source nodes are associated with non-leaf nodes of the index structure. Details of generating the IMI 36 are discussed in connection with FIG. 3(A) and FIG. 3(B) of the disclosure.

The non-volatile memory 22 of the server 12 is configured to include a design module 24 for generating the FMI 34 and IMI 36 indexes, a load module 26 for populating the IMI 36 index, a query module 28 for searching meta-data information in the IMI 36 index and an update module 30 for maintaining meta-data information in the IMI 36 index.

The design module 24 of the present invention associates a meta-data level with each object included in tree-structured data. For example, in one preferred embodiment, the design module 24 may associate a meta-data level to an element contained in an XML document by associating a value called ActualML to the element. Since XML documents are tree-structured, the design module 24 also may associate a meta-data level to an element through inheritance from the element's closest ancestor whose meta-data level is defined, if one is not explicitly specified for the element. In some preferred embodiments, the design module 24 also provides meta-data level inheritance to attribute and namespace nodes such that, attribute and namespace nodes inherit the same meta-data level as their parent element.

The design module 24 generates a meta-data level for elements from an ordered set. For example, in some preferred embodiments, the design module 24 may generate a meta-data level representing approximation accuracy as a rational in the set [0,1], recency as a timestamp value (like 2005-jan-01-1200), and a security level in a military environment as the set {unclassified, confidential, secret, top secret}, with an established ordering such as {unclassified}<{confidential}<{secret}<{top secret}.

In this disclosure, positive integers are used as meta-data levels, and a one-sided range constraint (e.g., approximation error<5%, update<timestamp 2005-jan-01-1200, and security level<secret), hereinafter referred to as 'uml', is used to identify desirable data, i.e., those that satisfy the meta-data constraint and is referred to as a meta-data query threshold.

FIG. 3(A) illustrates an example encoded data graph 50 (i.e., an XML data tree) generated by the design module 24. The encoded graph 50 represents an on-line seller. In one preferred embodiment, the design module 24 generates the encoded data graph 50 by accessing the XML data files 35a-c from the XML data store 32. As shown in FIG. 3(A), nodes are labeled with element tags or string values 52; solid edges 54 connect elements, whereas a dashed edge 56 connects an element to a string value. The graph 50 contains information concerning items 58 and accounts 60. The ActualML value of an element generated by the design module 24 is illustrated inside a circle, and for elements not having an ActualML attribute (e.g., the element payment-info 78), the design module 24 assigns through inheritance the meta-data level specified at their closest ancestor.

The design module 24 employs a novel encoding technique for nodes included in the data graph 50. For example, in one preferred embodiment, the design module 24 determines a rank Ln at which a node is encountered in a left to right depth first search (DFS) of the graph 50 and a rank Rn at which the node is encountered in a right to left DFS of the graph 50. The Ln and Rn ranks may be used by the system 10 for querying and updating meta-data information along ordered and structural axes, such as ancestor, descendant, following, and preceding.

In one preferred embodiment, the design module 24 also associates an additional number with each node, e.g., the parent node's Ln, hereinafter referred to as PLn, that permits level sensitive querying of information as well. Once the design module 24 calculates Ln, Rn, and PLn, the design module 24 generates a multi-dimensional index structure, such as an R-tree, on the Ln/Rn/PLn dimensions 64 that may be used to locate result elements along XPath axes (i.e., child, parent, descendant, ancestor, following, preceding, following-sibling, preceding-sibling). Conditions 66 for checking XPath axis 68 using the Ln/Rn/PLn dimensions 64 are illustrated in FIG. 2.

For example, as shown in FIG. 3(A), each element node is labeled with three numbers: Ln, Rn and PLn. The book node 70 (3,10,2) is a descendant of the all-items node 58 (2,9,1), and the book node 70 (3,10,2) precedes the account node 72 (7,3,6).

In one preferred embodiment, the design module 24 generates the FMI 34 index as an R-tree index on the Ln/Rn/PLn dimensions 64 for XPath location steps. In the FMI 34 index, the design module 24 associates a value, hereinafter referred to as 'MetadataLevel', for each XML element that contains the element's actual (i.e., explicitly specified) or inherited meta-data level. In one preferred embodiment, the FMI 34 index is configured to employ R-tree lookup algorithms that identify desired elements along an XPath axis from a specified element n that may additionally satisfy the meta-data constraint MetadataLevel≦uml.

The design module 24 also may generate the IMI 36 as an R-tree index. In the IMI 36 index, however, the design module 24 only associates actual metadata levels with elements for which an actual meta-data level value (e.g., ActualML) is explicitly specified. The design module 24 structures non-leaf page entries in the IMI 36 index to maintain information about meta-data levels that are inherited by elements in the (index) sub-tree of that non-leaf page entry.

Figure 3B:
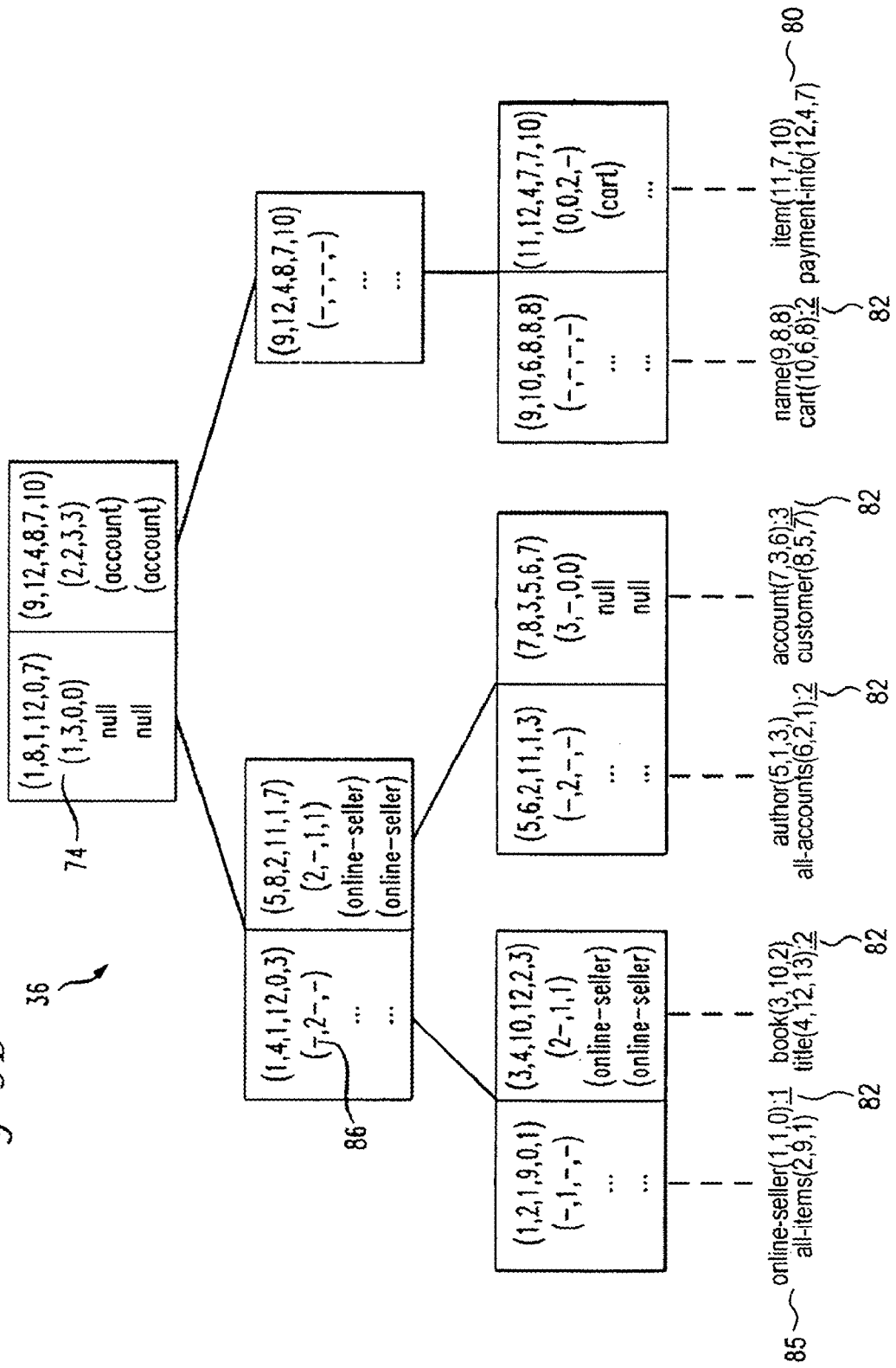
FIG. 3B illustrates an example Inheritance Meta-data Index based on FIG. 3A.

Referring now to the XML data of FIGS. 3(A) and 3(B), in one preferred embodiment, the design module 24 packs element nodes in leaf pages of an R-tree sorted by their Ln numbering. For example, as shown in the IMI 36 index of FIG. 3(B), the packing capacity of pages 74 is two nodes, although the IMI 36 index of the present invention is not limited to a two node packing capacity. The item 76 and payment-info 78 nodes are packed into the same leaf page 80. The design module 24 configures non-leaf page entries on the IMI 36 index to contain ranges for ActualML values. In one preferred embodiment, the design module 24 establishes ranges for each Ln, Rn and PLn in non-leaf page entries. The ActualML value of an element (i.e, explicitly defined meta-data level), where applicable, is shown in FIG. 3(B) following a ":" 82.

In this disclosure, the term SLP of a non-leaf index page entry p is used to denote the set of leaf pages rooted at p. An element node in a leaf page of SLP (p) is defined as a boundary node of SLP(p) if no ancestor element of that node is also in a leaf page of SLP(p). For example, the online-seller 84 node of FIG. 3(A) is a boundary node of the first leaf page 85 of FIG. 3(B), while both the item 76 and payment-info 78 nodes of FIG. 3(A) are boundary nodes of the last leaf page 80 of FIG. 3(B).

In some preferred embodiments, the design module 24 may configure a leaf page to contain elements whose meta-data levels are inherited from elements in other leaf pages, and whose inherited meta-data levels may be desirable, even if none of the elements with explicitly defined meta-data levels in the leaf page are desirable. In these embodiments, the design module 24 configures non-leaf index page entries in the IMI 36 index to maintain ranges of inherited metadata levels, hereinafter referred to as lowInheritedML and highInheritedML, respectively, corresponding to meta-data levels inherited by elements in the corresponding SLP from elements of other SLPs. In particular, the design module 24 configures the IMI 36 index, such that, meta-data levels inherited by boundary nodes of an SLP that do not have an ActualML value defined, influence the lowInheritedML and highInheritedML values of the SLP. In one preferred embodiment, the element nodes in leaf pages entries of the IMI 36 index are not configured to store InheritedML values; only the non-leaf page entries maintain ranges of these values.

In some preferred embodiments, ActualML and InheritedML values alone may not suffice for efficient maintenance of the IMI 36 index under updates to the actual meta-data level of an element. For example, update of a node n whose ActualML may be changed from 3 to 4 may affect the inherited meta-data levels of descendants of n. If the lowInheritedML and highInheritedML values in a page entry involving descendants of n become 3 and 5, respectively, the design module 24 determines whether the lowInheritedML of 3 is to be changed to 4 or remains unchanged. The design module 24 provides this functionality by storing the identities of XML element nodes from where these low and high meta-data levels are inherited. In one preferred embodiment, the design module 24 configures the IMI 36 index to maintain this information in non-leaf page entries as values for the lowInheritList and highInheritList attributes.

The design module 24 also may configure non-leaf page entries in the IMI 36 index to maintain ranges (alternating low and high values) for each of Ln, Rn, PLn, ActualML, InheritedML, and InheritList. Of these, the XML elements in the leaf pages of the IMI 36 index are configured to have values for Ln, Rn, PLn and ActualML.

In one preferred embodiment, the following conventions are used by the design module 24 in configuring the IMI 36 index. A value of 0 for low/high actual meta-data levels in a non-leaf page entry implies that no element node in the SLP has an ActualML defined, hence all boundary nodes in the SLP inherit their meta-data levels from outside. A value of 0 for low/high inherited meta-data levels in a non-leaf page entry implies that no node in the SLP inherits its metadata level from outside the SLP, hence, all boundary nodes in the SLP have values defined for ActualML. In one preferred embodiment, whenever the value of a meta-data related attribute in a non-leaf page entry in the IMI 36 index is the same as that in its parent non-leaf page entry, the design module 24 maintains this information in the child entry using a special symbol "–" 86. This technique may be very useful to bound the propagation of updates to InheritedML and InheritList values, under meta-data level updates and is shown in FIG. 3(B).

Referring back to FIG. 1, the load module 26 provides efficient bulk loading of data into the IMI 36 index. In one preferred embodiment, the load module 26 loads XML data into the IMI index 36 using Ln ordering. Using Ln ordering may be very efficient since the Ln number (i.e., preorder) reflects the hierarchical structure of XML data and Ln packing may typically places nodes that are close in the hierarchy into the same leaf page.

The load module 26 provides maintenance of the Ln, Rn, PLn and ActualML ranges, as pages are formed, during bulk load of the IMI 36 index. In one preferred embodiment, the load module 26 calculates values for InheritedML and InheritList attributes efficiently for each of the non-leaf index page entries by identifying the boundary nodes that correspond to these low and high values in an SLP. In one preferred embodiment, the load module 26 executes a stack-based bulk load to load information into the IMI 36 index. The stack is implemented by the load module 26 as follows: If a new node to be loaded is not a child of the top stack node, the load module 26 pops stack nodes until the parent is found. The load module 26 then pushes the new node onto the stack and, if the new node does not define its own ActualML, the load module 26 determines the new node's inherited meta-data level using the meta-data level of its parent in the stack.

The load module 26 uses the stack to construct SLPs as follows. First, the load module 26 identifies the boundary nodes in a leaf page by computing and maintaining a page identifier number with each node. Next, the load module 26 compares the page identifier number of the node at the top of the stack with that of the current node. Once all boundary nodes that do not have an ActualML in a single page are identified, the load module 26 sets the range of values for InheritedML and InheritList for its parent non-leaf index page entry. To obtain the boundary nodes of an SLP higher up in the index tree, the load module 26 implements a bottom-up technique to test if there is an ancestor-descendant relationship between the boundary nodes of the child pages of the non-leaf index page. The load module 26 promotes a boundary node of a child page to the parent page only if the boundary node is not a descendant of another boundary node in the parent page.

FIG. 4 illustrates pseudo-code for the computation of lowActualML and lowInheritedML values. Computation of the lowInheritlist also is shown. In one preferred embodiment, repeated invocations of the algorithm bulkLoad 88 by the load module 26 loads N XML element nodes to the IMI 36 index at a cost of O(NlogN).

Referring back to FIG. 1, the query module 28 provides index lookup algorithms for the IMI 36 index that return the set of nodes with a meta-data level≦uml along an XPath location step. As discussed previously, the conditions for matching XPath location steps along the major XPath axes, relying only on Ln, Rn, and PLn, in the absence of any meta-data level information, are illustrated in FIG. 2.

In one preferred embodiment, to traverse axis independent pages of the IMI 36 index, the query module 28 starts from each entry in the root page of the IMI 36 index and traverses one or more paths down the tree structure. The query module 28 uses the following meta-data search conditions in the traversal:

Condition Rule

1st. if min(lowInheritedML, lowActualML)≠0, and min(lowInheritedML, lowActualML)≦uml and uml≦max(highInheritedML, highActualML) in an index page entry, continue to child page.
2nd. if uml>max(highInheritedML, highActualML) in an index page entry, continue to child index page.
3rd. if uml<min(lowInheritedML, lowActualML) in an index page entry, do not enter child index page.
4th. if lowInheritedML=0, and uml<lowActualML in an index page entry, do not enter child index page.
5th. if lowActualML=0, and uml<lowInheritedML in an index page entry, do not enter child index page.

Applying the 1st condition, the query module 28 can determine that some XML elements in the leaf pages rooted at the index page entry are desirable, while others are not. Applying the 2nd condition, the query module 28 may determine that all elements in the leaf pages rooted at the index page entry are desirable. Applying the 3rd-5th conditions, the query module 28 may determine that none of the elements in the leaf pages rooted at the index page entry are desirable.

Although the query module 28 uses the low/high values of ActualML and InheritedML to identify which leaf pages contain potentially desirable elements, if a leaf page is reached using the 1st condition (above) from its parent page entry, it is possible that some of the XML elements may not be desirable. For example, when the meta-data query threshold (e.g., uml) is between the low and high values of InheritedML for that leaf page, finding the nearest ancestors of the boundary nodes of the page, whose metadata level is specified, may be unavoidable. To address this issue, in some preferred embodiments, the query module 28 determines meta-data levels on a per-element basis.

Since an XPath location step starts from a specific element n, and identifies all elements reachable from n by using a specific XPath axis, the query module 28 can optimize the number of "nearest ancestor" calls necessary by using knowledge of an element n's desirability and the specific axis to be traversed. FIG. 5 illustrates a traversal algorithm 90 that may be implemented by the query module 28 for querying across eight XPath axes.

For example, in one preferred embodiment, when the query module 28 traverses a child axis of the IMI 36 index and a desirable element n's child n1 does not define a value for ActualML, n1 inherits the same meta-data level as n, and is considered desirable by the query module 28. If n1 defines its own ActualML (thus overriding any inherited meta-data level), the query module 28 checks n1's desirability by comparing the meta-data query threshold (e g, uml) with n1's ActualML value. In neither case does the query module 28 need to perform a "nearest ancestor" call when following a child axis.

When the query module 28 traverses a parent axis of the IMI 36 index and n1 represents a parent element of a desirable element n and neither have a value for ActualML, the query module 28 also does not need to perform a "nearest ancestor" call since n1's desirability is the same as that of n.

In one preferred embodiment, when traversing ancestor and descendant axes of the IMI 36 index, the query module 28 generates a stack data structure that is used to keep track of desirable elements. If the current element being considered in a leaf page does not define its own ActualML, and its parent element is at the top of the stack, the query module 28 determines that the node is desirable. Otherwise, the query module 28 determines that the current element is desirable only when its ActualML is no larger than the meta-data query threshold. The query module 28 avoids performing nearest ancestor calls by employing this stack-based technique.

The query module 28 employs a similar algorithm as that of traversing ancestor/descendant axis when traversing following and proceeding axis. One difference is that when the query module 28 processes the stack for the ancestor or descendant axis, the stack may never become empty (except in an initial stack). The stack may, however, become empty when traversing following or preceding axes. To address this issue, the query module 28 maintains a list containing all desirable ancestors of the current node before evaluating the following or preceding axes. In one preferred embodiment, the query module 28 determines the list by traversing an ancestor axis from the current element. Once the stack is empty and a following or preceding element is returned without a specified meta-data level, the query module 28 checks the list to determine if its parent is in the list. If it is, the query module 28 determines that the result element is desirable and pushes it onto the stack. This technique may improve efficiency of query evaluation over repeated use of nearest ancestor calls when the stack is empty.

The query module 28 traverses following-sibling and preceding-sibling axes based on the presence or absence of ActualML at the current node. Hence, the technique used by the query module 28 to traverse following-sibling and preceding-sibling axes is similar to the technique used to traverse parent axis.

In one preferred embodiment, to perform a nearest ancestor call, the query module 28 starting from an element n, traverses the IMI 36 index right to left, both for non-leaf and leaf pages. The query module 28 uses the conditions of meta-data searching disclosed previously at non-leaf index pages to determine whether n's ActualML would make the current node desirable or not. If the 2nd condition evaluates true in the page entry, the query module 28 determines that the nearest ancestor satisfies the meta-data range constraint before it is actually found. However, if the 3rd-5th conditions evaluate true in the page entry, the query module 28 determines that the nearest ancestor does not satisfy the meta-data range constraint. An optimized algorithm to perform a nearest ancestor call is shown in the nearestAnc procedure 92 of FIG. 5.

Referring back to FIG. 1, the update module 30 updates meta-data levels included in the IMI 36 index. The update module 30 processes insertions and deletions of nodes without any defined ActualML value similarly to that performed with regular R-trees. In one preferred embodiment, modifying a node's ActualML value triggers two updates by the update module 30: one is for index page entries along index paths where the element is present (i.e., modification of actual meta-data level ranges) and the other for index entries along index paths where descendants of the node are present (i.e., modification of inherited meta-data level ranges).

For example, in one preferred embodiment, when the ActualML value of a node is changed from a "3" to "2" and values of lowActualML and highActualML in an index entry where the node belongs have a value of "3", the update module 30 directly updates the value of lowActualML to "2" using a top-down update technique and delays a decision of how (and if) to update the value of highActualML until the leaf page is scanned. Hence, in some preferred embodiments, the update module 30 also may employ a bottom-up update technique to decide how (and if) to update the value of highActualML.

In one preferred embodiment, the update module 30 using the top-down update technique navigates the index tree down from a root page, using the identifier of a given node (i.e., Ln, Rn, and PLn) to identify a leaf page containing the data node. The update module 30 also may make the implicit values ("–") of lowActualML and highActualML explicit during index tree traversal and modify the ActualML of a node once the leaf page is reached. Once the leaf page is reached, the update module 30 then may invoke the bottom-up update technique. In one preferred embodiment, the update module 30 maintains certain "–" values unaltered if the change in meta-data level cannot affect the old value of the meta-data level.

The update module 30 uses the bottom-up update technique to change back the index page entries correctly. For example, in one preferred embodiment, the update module 30 may ensure that implicit ("–") values are properly recorded using the bottom-up update technique. In one preferred embodiment, the update module 30 propagates the modified ActualML back up the index tree and modifies the lowActualML or highActualML values by making them implicit as needed. In particular, the bottom-up update technique implemented by the update module 30 operates as follows: If the value lowActualML of the child page entry is the same as that of the parent page entry, the value at the child page entry is modified back to "–". If the value at the child page entry is "–", then the old value at the parent page is propagated down only to the child page, instead of propagating the old value all the way down to the leaves. Using the bottom-up update technique, the update of actual meta-data levels may be completed with only a single path traversal down and up on the index tree.

Figure 6A:
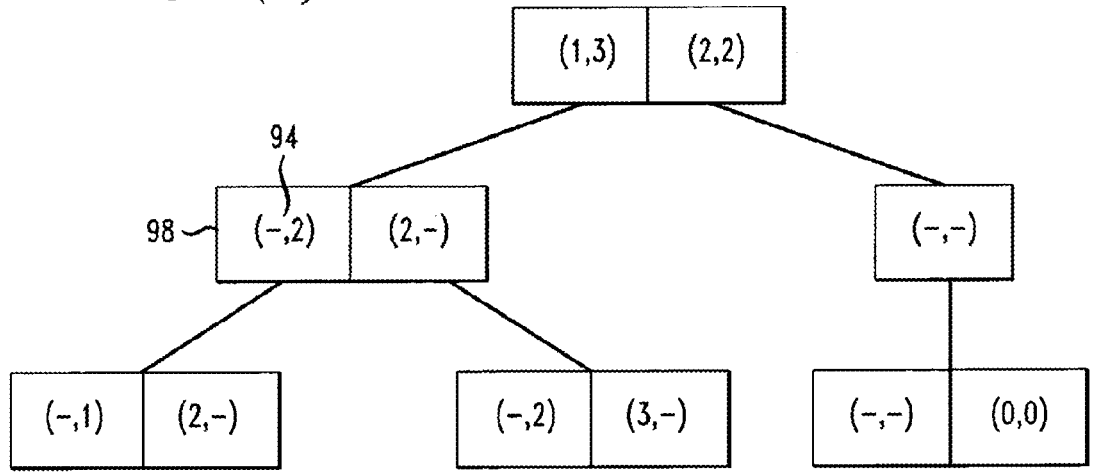
FIGS. 6(A-C) illustrate an example actual meta-data level update.
Figure 6B:
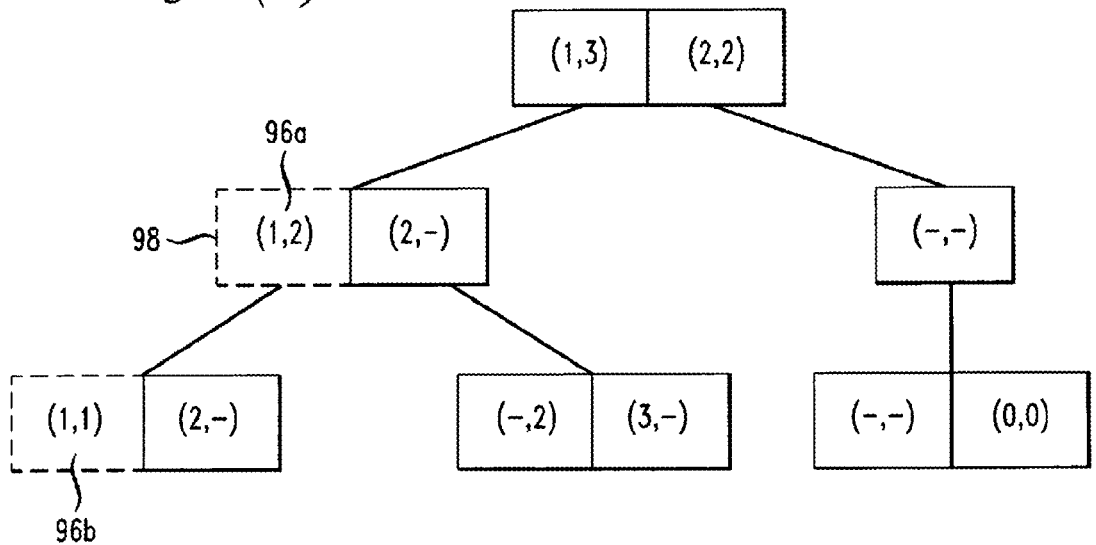
Figure 6C:
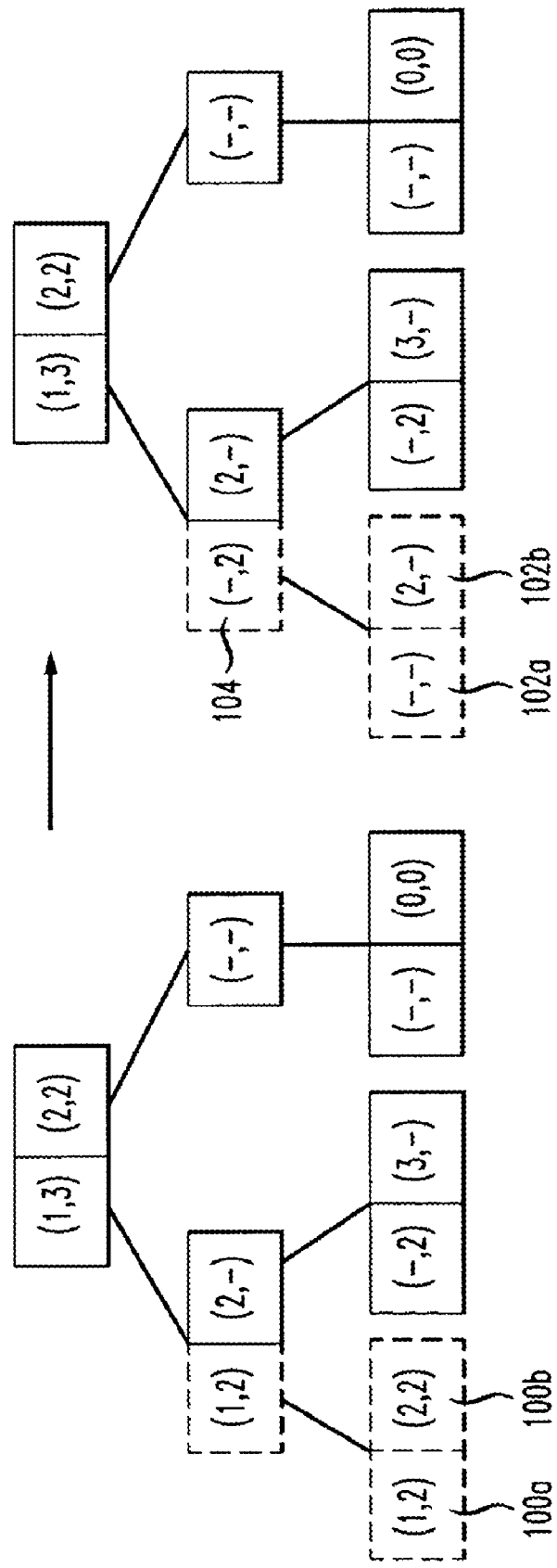

For example, referring now to FIG. 3(A) and FIGS. 6(A-C), the update module 30 uses the bottom-up update technique to record only the lowActualML and highActualML values in page entries. FIG. 6(A) depicts initial non-leaf page entries, FIG. 6(b) shows the result of the top-down update technique in which the value "–" 94 of the page entry 98 in FIG. 6(A) is changed to a value of "1" 96a, 96b, and FIG. 6(c) shows how the lowActualML and highActualML values are finalized using the bottom-up update technique. As shown in FIG. 6(C), the first highActualML value is changed to a value of "2" 100a, 100b in the page, and then the same value in the child page is changed to "–" 102a, 102b and the value "–" 104 is replaced by the old value of highActualML, i.e., "2", in the parent page.

Pseudo-code for updating ActualML values using both the top-down and bottom-up update techniques is shown in FIG. 7. As shown in FIG. 7, the procedure modifyML 106 is designed to modify a meta-data level of a given node n to a new meta-data level ML.

The update module 30 of the present invention also modifies inherited meta-data levels in response to a change of an actual meta-data level. The update module 30 updates inherited meta-data levels using a modified top-down technique and a modified bottom-up technique.

In one preferred embodiment, the update module 30 uses the modified top-down technique to first traverse down the index tree to identify pages for a given element node or its descendants, and makes explicit the values of lowInheritedML, highInheritedML, lowInheritList, highInheritList. The modified bottom-up update technique is invoked by the update module 30 when reaching leaf pages.

For example, the update module 30 may use the modified top-down technique to identify if a page contains only descendants of the given node and whether no meta-data level is inherited into the page. In some preferred embodiments, the update module 30 also may use the modified top-down technique to determine if a page contains only descendants of the given node but some other node blocks the given node's meta-data level from being inherited by the page, or whether the given node is the only node whose meta-data level determines the value highInheritedML or lowInheritedML of the subtree rooted at a page entry.

The update module 30 then invokes the modified bottom-up update technique to propagate inherited meta-data level information and lists back up the index tree. In some preferred embodiments, the update module 30 also may modify and make implicit values and lists using the modified bottom-up technique. For example, the update module 30 may use the modified bottom-up technique to propagate values and lists to child pages and to revert to "–" in the same manner as described with updates to actual meta-data levels.

In several preferred embodiments, the bottom-up technique is configured to operate on a global stack that maintains information on how inheritance works for data items in a leaf page and facilitates complex logic involving a nearest ancestor with an explicit meta-data level where the meta-data level of a node is removed, both when a given node is present in the page and when a descendant of the node is present in the page. In these preferred embodiments, the update module 30 then may use the modified bottom-up technique to correct values lowInheritedML and highInheritedML and lists lowInheritList and highInheritList of non-leaf index pages and to determine if the list contains an ancestor of the given node with a new meta-data level.

Figure 8A:
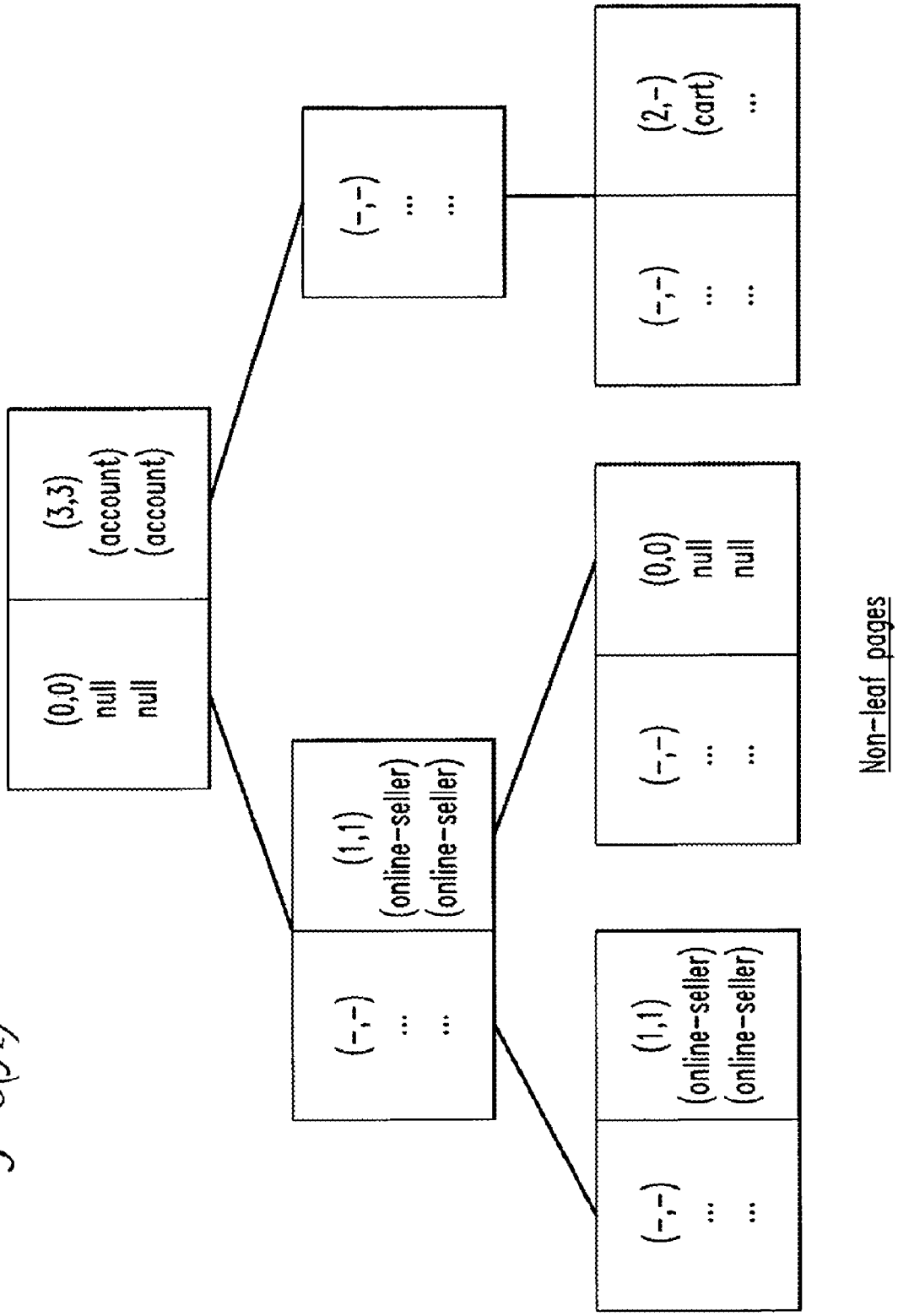
FIGS. 8(A-C) illustrates an example inherited meta-data level update.
Figure 8B:
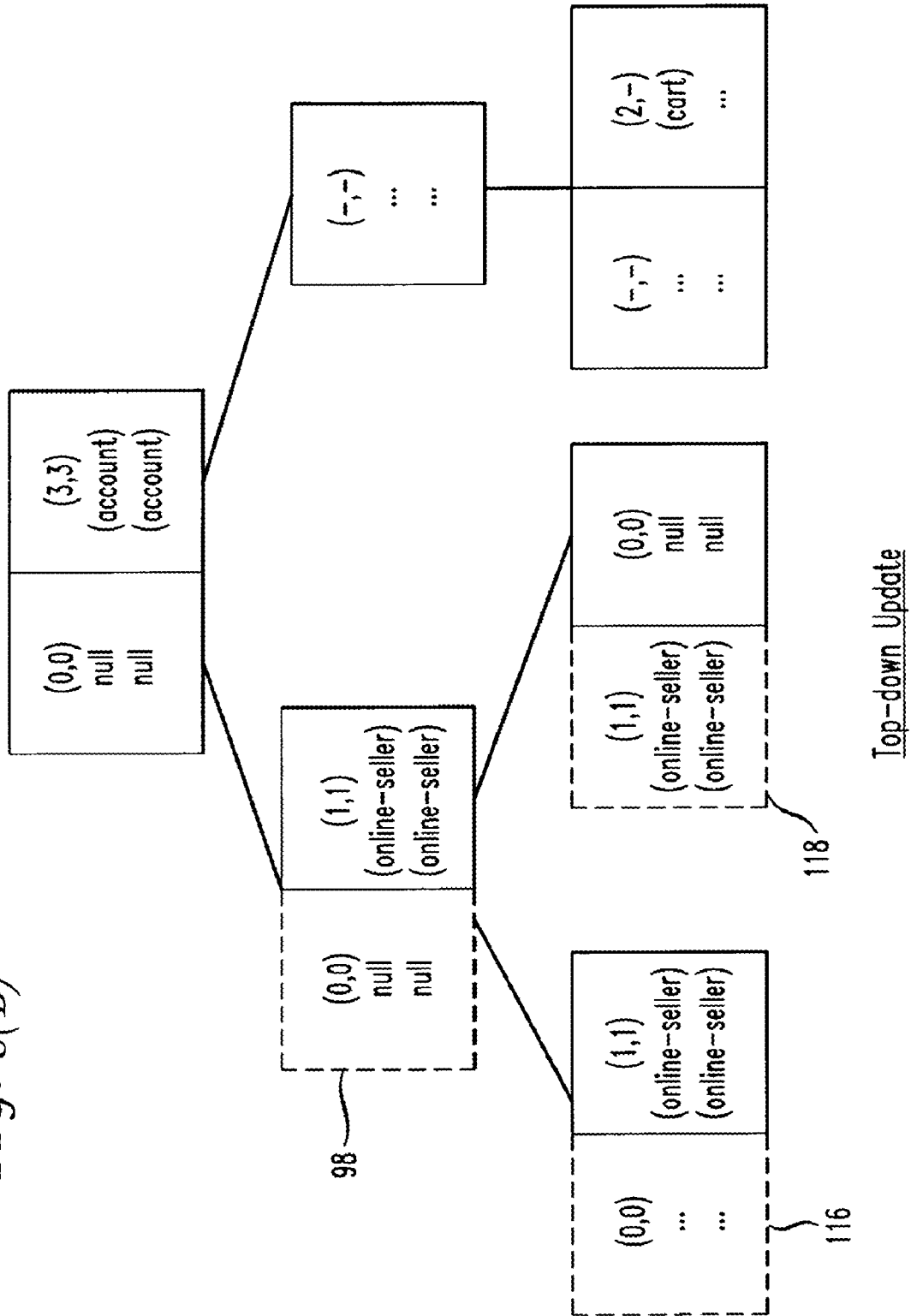
Figure 8C:
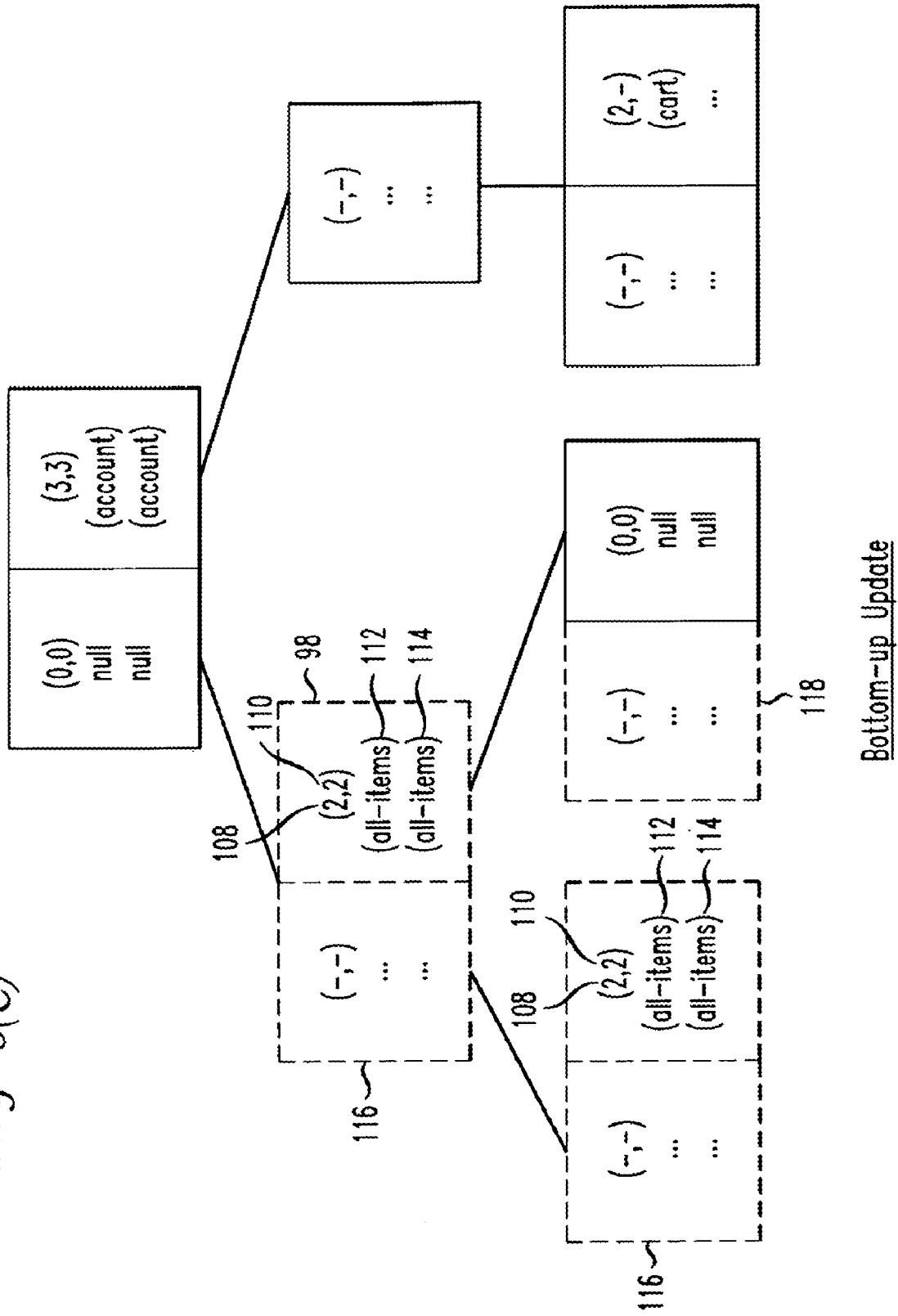

For example, referring now to FIGS. 8(A-C), an update of inherited meta-data levels using a new meta-data level value of "2" for the node all-items 98 is shown. The values of lowInheritedML 108, highInheritedML 110, and lists of lowInheritList 112, highInheritList 114 are recorded. As the metadata level of the node all-items 98 is changed, the inherited meta-data levels of its descendants, i.e., book 116 and author 118, are also changed to a value of "2". Since the nodes all-items 98 and book 116 illustrated in FIGS. 8(A-C) are not in the same leaf page and the book 118 node is a boundary node, the values lowInheritedML 108, highInheritedML 110 are changed to a value of "2" and the corresponding lists lowInheritList 112 and highInheritList 114 are updated to contain the all-items 98 node using the modified bottom-up technique. The update module 30 uses the same technique to modify the pages containing the author 118 node.

In one preferred embodiment, the maximum size of the InheritLists at a non-leaf page entry is a function of the number of items in the SLP. Furthermore, the Ln ordering may keep elements clustered with their descendants, ensure that only a small size InheritList be maintained, and allow for fixed size leaf and non-leaf index pages. Pseudo-code of a procedure InheritML 120 to update inherited meta-data level information is shown in FIG. 9.

Various features of the system may be implemented in hardware, software, or a combination of hardware and software. For example, some features of the system may be implemented in one or more computer programs executing on programmable computers. In addition, each such computer program may be stored on a storage medium such as read-only-memory (ROM) readable by a general or special purpose programmable computer or processor, for configuring and operating the computer to perform the functions described above.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of encoding meta-data associated with tree-structured data, the method comprising:
   associating explicitly a first set of elements of a plurality of elements in the tree-structured data with explicit meta-data levels;
   associating by inheritance a second set of elements of the plurality of elements in the tree-structured data with explicit meta-data levels of closest ancestor elements of the first set of elements;
   packing the plurality of elements in the tree-structured data, including the first set of elements and the second set of elements and the meta-data levels associated with the first set of elements and the second set of elements, into a plurality of leaf nodes of an index structure;
   merging the plurality of leaf nodes of the index structure into a plurality of non-leaf nodes of the index structure until a root non-leaf node is generated; and
   associating the plurality of non-leaf nodes of the index structure with indicators representing ranges of the explicit meta-data levels in the packed first set of elements, such that explicit meta-data level ranges of descendant non-leaf nodes are subsets of explicit meta-data level ranges of ancestor non-leaf nodes.

2. The method of claim 1, wherein associating the plurality of non-leaf leaf nodes of the index structure with indicators includes assigning a non-leaf node indicators representing a range of explicit meta-data levels, the range of explicit meta-data levels including a low explicit meta-data level and a high explicit meta-data level associated with at least one descendent non-leaf node.

3. The method of claim 1, wherein associating the plurality of non-leaf leaf nodes of the index structure with indicators includes assigning a non-leaf node indicators representing a range of explicit meta-data levels, the range of explicit meta-data levels including a low explicit meta-data level and a high explicit meta-data level associated with a descendent leaf node.

4. The method of claim 1, wherein associating the plurality of non-leaf leaf nodes of the index structure with indicators includes assigning a non-leaf node an indicator which indicates that the non-leaf node's explicit meta-data level is the same as an explicit meta-data level of the non-leaf node's ancestor non-leaf node.

5. The method of claim 1, further comprising associating the plurality of non-leaf nodes of the index structure with indicators representing ranges of inherited meta-data levels in the packed second set of elements, such that inherited meta-data level ranges of descendant non-leaf nodes are subsets of inherited meta-data level ranges of ancestor non-leaf nodes.

6. The method of claim 5, wherein associating the plurality of non-leaf nodes of the index structure with indicators includes assigning a non-leaf node indicators representing a range of inherited meta-data levels, the range of inherited meta-data levels including a low inherited meta-data level and a high inherited meta-data level associated with at least one descendent non-leaf node.

7. The method of claim 5, wherein associating the plurality of non-leaf nodes of the index structure with indicators includes assigning a non-leaf node indicators representing a range of inherited meta-data levels, the range of inherited meta-data levels including a low inherited meta-data level and a high inherited meta-data level associated with a descendent leaf node.

8. The method of claim 5, wherein associating the plurality of non-leaf leaf nodes of the index structure with indicators includes assigning a non-leaf node an indicator which indicates that the non-leaf node's inherited meta-data level is the same as an inherited meta-data level of the non-leaf node's ancestor non-leaf node.

9. A system of encoding meta-data associated with tree-structured data, the system including a processing device comprising a design module configured to:
associate explicitly a first set of elements of a plurality of elements in the tree-structured data with explicit meta-data levels;
associate by inheritance a second set of elements of the plurality of elements in the tree-structured data with explicit meta-data levels of closest ancestor elements of the first set of elements;
pack the plurality of elements in the tree-structured data, including the first set of elements and the second set of elements and the meta-data levels associated with the first set of elements and the second set of elements, into a plurality of leaf nodes of an index structure;
merge the plurality of leaf nodes of the index structure into a plurality of non-leaf nodes of the index structure until a root non-leaf node is generated; and
associate the plurality of non-leaf nodes of the index structure with indicators representing ranges of the explicit meta-data levels in the packed first set of elements, such that explicit meta-data level ranges of descendant non-leaf nodes are subsets of explicit meta-data level ranges of ancestor non-leaf nodes.

10. The system of claim 9, wherein the design module is further configured to assign a non-leaf node indicators representing a range of explicit meta-data levels, the range of explicit meta-data levels including a low explicit meta-data level and a high explicit meta-data level associated with at least one descendent non-leaf node.

11. The system of claim 9, wherein the design module is further configured to assign a non-leaf node indicators representing a range of explicit meta-data levels, the range of explicit meta-data levels including a low explicit meta-data level and a high explicit meta-data level associated with a descendent leaf node.

12. The system of claim 9, wherein the design module is further configured to assign a non-leaf node an indicator which indicates that the non-leaf node's explicit meta-data level is the same as an explicit meta-data level of the non-leaf node's ancestor non-leaf node.

13. The system of claim 9, wherein the design module is further configured to associate the plurality of non-leaf nodes of the index structure with indicators representing ranges of the inherited meta-data levels in the packed second set of elements, such that inherited meta-data level ranges of descendant non-leaf nodes are subsets of inherited meta-data level ranges of ancestor non-leaf nodes.

14. The system of claim 13, wherein the design module is further configured to assign a non-leaf node indicators representing a range of inherited meta-data levels, the range of inherited meta-data levels including a low inherited meta-data level and a high inherited meta-data level associated with at least one descendent non-leaf node.

15. The system of claim 13, wherein the design module is further configured to assign a non-leaf node indicators representing a range of inherited meta-data levels, the range of inherited meta-data levels including a low inherited meta-data level and a high inherited meta-data level associated with a descendent leaf node.

16. The system of claim 13, wherein the design module is further configured to assign a non-leaf node an indicator which indicates that the non-leaf node's inherited meta-data level is the same as an inherited meta-data level of the non-leaf node's ancestor non-leaf node.

17. A computer-readable storage medium storing operational instructions that, when executed by a processor, cause the processor to:
associate explicitly a first set of elements of a plurality of elements in tree-structured data with explicit meta-data levels;
associate by inheritance a second set of elements of the plurality of elements in the tree-structured data with explicit meta-data levels of closest ancestor elements of the first set of elements;
pack the plurality of elements of the tree-structured data, including the first set of elements and the second set of elements and the meta-data levels associated with the first set of elements and the second set of elements, into a plurality of leaf nodes of an index structure;
merge the plurality of leaf nodes of the index structure into a plurality of non-leaf nodes of the index structure until a root non-leaf node is generated; and
associate the plurality of non-leaf nodes of the index structure with indicators representing ranges of the explicit meta-data levels in the packed first set of elements, such that explicit meta-data level ranges of descendant non-leaf nodes are subsets of explicit meta-data level ranges of ancestor non-leaf nodes.

18. The computer-readable storage medium of claim 17, wherein operational instructions that cause the processor to associate the plurality of non-leaf leaf nodes of the index structure with indicators include operational instructions that, when executed by a processor, cause the processor to assign a non-leaf node indicators representing a range of explicit meta-data levels, the range of explicit meta-data levels including a low explicit meta-data level and a high explicit meta-data level associated with at least one descendent non-leaf node.

19. The computer-readable storage medium of claim 17, wherein operational instructions that cause the processor to associate the plurality of non-leaf leaf nodes of the index structure with indicators include operational instructions that, when executed by a processor, cause the processor to assign a non-leaf node indicators representing a range of explicit meta-data levels, the range of explicit meta-data levels including a low explicit meta-data level and a high explicit meta-data level associated with a descendent leaf node.

20. The computer-readable storage medium of claim 17, further comprising operational instructions that, when executed by a processor, cause the processor to associate the plurality of non-leaf nodes of the index structure with indicators representing ranges of inherited meta-data levels in the packed second set of elements, such that inherited meta-data level ranges of descendant non-leaf nodes are subsets of inherited meta-data level ranges of ancestor non-leaf nodes.

* * * * *